(12) United States Patent
Horie et al.

(10) Patent No.: US 7,678,007 B2
(45) Date of Patent: Mar. 16, 2010

(54) RECLINING DEVICE INCORPORATION BY REFERENCE

(75) Inventors: Masato Horie, Fujisawa (JP); Yoichi Takada, Fujisawa (JP)

(73) Assignee: Shiroki Kogyo Co., Ltd, Fujisawa-shi (JP)

( * ) Notice: Subject to any disclaimer, the term of this patent is extended or adjusted under 35 U.S.C. 154(b) by 514 days.

(21) Appl. No.: 11/593,559

(22) Filed: Nov. 7, 2006

(65) Prior Publication Data
US 2007/0295161 A1    Dec. 27, 2007

(30) Foreign Application Priority Data
Jun. 8, 2006    (JP)    ............................. 2006-160198

(51) Int. Cl.
*F16H 1/32*    (2006.01)
(52) U.S. Cl. .................. 475/180; 475/162; 475/344
(58) Field of Classification Search ............... 475/344, 475/331, 332, 162, 175, 180; 74/640; 297/378.14, 297/378.12, 344.11, 362
See application file for complete search history.

(56) References Cited

U.S. PATENT DOCUMENTS

| 7,086,699 B1 * | 8/2006 | Addison et al. | 297/374 |
| 7,090,298 B2 * | 8/2006 | Lange | 297/362 |
| 7,285,067 B2 * | 10/2007 | Krambeck et al. | 475/162 |
| 7,322,654 B2 * | 1/2008 | Kawashima | 297/362 |
| 7,354,108 B2 * | 4/2008 | Matsumoto et al. | 297/362 |

FOREIGN PATENT DOCUMENTS

JP    7-79740    8/1995

* cited by examiner

*Primary Examiner*—David D Le
(74) *Attorney, Agent, or Firm*—Finnegan, Henderson, Farabow, Garrett & Dunner, L.L.P.

(57) ABSTRACT

The present invention relates to a reclining device that includes an external teeth gear and an internal teeth gear and in which the rotation axis of one of the external teeth gear and the internal teeth gear revolves around the rotation axis of the other. The present invention aims to provide a reclining device of which the operation force is small and the operation force varies little. To achieve the aim, one of (a) the plane of each of the external teeth 31*b* that engages with the internal teeth 32*b* and (b) the plane of each of the internal teeth 32*b* that engages with the external teeth 31*b* is arranged to be flat, and the other of (a) and (b) is arranged to be convex.

2 Claims, 13 Drawing Sheets

(PRIOR ART)

RECLINING DEVICE INCORPORATION BY REFERENCE

The disclosure of Japanese Patent Application No. JP 2006-160198 filed on Jun. 8, 2006 including the specification, drawings and abstract is incorporated herein by reference in its entirety.

BACKGROUND OF THE INVENTION

1. Field of the Invention

The present invention relates to a reclining device that includes an external teeth gear and an internal teeth gear and in which the rotation axis of one of the external teeth gear and the internal teeth gear revolves around the rotation axis of the other, the external teeth gear having external teeth on the outer circumferential surface thereof and being disposed with one of a member on the seat cushion side and a member on the seat back side, and the internal teeth gear having internal teeth of which the number of teeth is larger than that of the external teeth of the external teeth gear and that are configured so as to engage with the external teeth and being disposed with the other of the member on the seat cushion side and the member on the seat back side.

2. Description of the Related Art

One example of reclining devices that allow continuous adjustments is a reclining device that includes an external teeth gear and an internal teeth gear and in which the rotation axis of one of the external teeth gear and the internal teeth gear revolves around the rotation axis of the other, the external teeth gear having external teeth on the outer circumferential surface thereof and being disposed with one of a member on the seat cushion side and a member on the seat back side, and the internal teeth gear having internal teeth of which the number of teeth is larger than that of the external teeth of the external teeth gear and that are configured so as to engage with the external teeth and being disposed with the other of the member on the seat cushion side and the member on the seat back side.

The external teeth of the external teeth gear and the internal teeth of the internal teeth gear that are included in such a reclining device are shaped so as to be involute teeth, as shown in FIG. 13. To be more specific, as shown in the drawing, the plane, within the range B, of each of the external teeth 3 of the external teeth gear 1 that engages with the internal teeth 7 of the internal teeth gear 5 is convex and protrudes in the direction of the internal tooth 7. On the other hand, the plane, within the range A, of each of the internal teeth 7 of the internal teeth gear 5 that engages with the external teeth 3 of the external teeth gear 1 is concave and is recessed in the direction away from the external tooth 3 (For example, see Japanese Examined Patent Publication (Kokoku) No. H7-79740 (FIG. 3).

SUMMARY OF THE INVENTION

The internal teeth gear and the external teeth gear included in such a reclining device are each manufactured by pressing and shaping a thick steel sheet by squeezing it in the thickness direction. Thus, the plane at which each of the internal teeth of the internal teeth gear engages with an external tooth and the plane at which each of the external teeth of the external teeth gear engages with an internal tooth have surface roughness (unevenness) as large as approximately 0.01 mm. In the case where an external tooth is engaging with an internal tooth, the range within which the distance between the plane of the external tooth engaging with the internal tooth and the plane of the internal tooth engaging with the external tooth is equal to or smaller than the surface roughness (e.g. 0.01 mm) is the range C shown in FIG. 13.

If there is a bump due to the surface roughness in a portion of an external tooth that engages with an internal tooth or in the vicinity thereof or in a portion of an internal tooth that engages with an external tooth or in the vicinity thereof, when the external tooth engages and the internal tooth engage with each other, the bump hits the engaging teeth. This causes a phenomenon where the revolution orbit of the external teeth gear deviates from a predetermined course, and thus the operation force becomes larger.

In addition, if there is a bump due to the surface roughness, the internal tooth and the external tooth engage with each other somewhere within the range C. When the length of the range C is large, the point at which an internal tooth and an external tooth engage with each other varies largely in the radial direction of the internal teeth gear and the external teeth gear. This causes a problem where the operation force varies.

In view of the problems described above, it is an object of the present invention to provide a reclining device that has a small operation force and with which the operation force varies little.

The invention defined in aspect 1 presents a reclining device that includes an external teeth gear and an internal teeth gear and in which the rotation axis of one of the external teeth gear and the internal teeth gear revolves around the rotation axis of the other, the external teeth gear having external teeth on the outer circumferential surface thereof and being disposed with one of a member on the seat cushion side and a member on the seat back side, and the internal teeth gear having internal teeth of which the number of teeth is larger than that of the external teeth of the external teeth gear and that are configured so as to engage with the external teeth and being disposed with the other of the member on the seat cushion side and the member on the seat back side, the reclining device being characterized in that one of (a) the plane of each of the external teeth that engages with the internal teeth and (b) the plane of each of the internal teeth that engages with the external teeth is flat, whereas the other of (a) and (b) is convex.

When one of the external teeth gear and the internal teeth gear rotates, the external teeth gear having the external teeth on the outer circumferential surface thereof and being disposed with one of the member on the seat cushion side and the member on the seat back side, and the internal teeth gear having the internal teeth of which the number of teeth is larger than that of the external teeth of the external teeth gear and that are configured so as to engage with the external teeth and being disposed with the other of the member on the seat cushion side and the member on the seat back side, the rotation axis of one of the external teeth gear and the internal teeth gear revolves around the rotation axis of the other, and therefore the angle between the seat back and the seat cushion changes.

The invention defined in aspect 2 presents the reclining device according to aspect 1 characterized in that the plane of each of the internal teeth that engages with the external teeth is flat, and the external teeth are involute teeth.

According to the invention defined in aspect 1 and aspect 2, one of (a) the plane of each of the external teeth that engages with the internal teeth and (b) the plane of each of the internal teeth that engages with the external teeth is flat, whereas the other of (a) and (b) is convex. Thus, the distance between the plane of each of the external teeth that engages with the internal teeth and the plane of each of the internal teeth that engages with the external teeth becomes wider more rapidly than in the case where both the internal teeth and the external teeth are involute teeth (having convex planes and concave planes), like in an example according to the conventional technique.

As a result, if the reclining device according to the present invention and the reclining device according to the conventional technique each have a bump due to the surface roughness that has an equal height and an equal distance from the engagement position, the reclining device according to the present invention has a smaller deviation in the revolution orbit of the external teeth caused by the bump, and also has a smaller operation force, than in the reclining device according to the conventional technique.

In addition, when the external teeth and the internal teeth engage with one another, the range within which the distance between the plane of each of the external teeth that engages with the internal teeth and the plane of each of the internal teeth that engages with the external teeth is equal to or smaller than the surface roughness is smaller than the one according to the conventional technique. Thus, the point at which an internal tooth and an external tooth engage with each other varies less in the radial direction of the internal teeth gear and the external teeth gear, and therefore the operation force also varies less.

BRIEF DESCRIPTION OF THE DRAWINGS

FIG. 7B is a cross-sectional view at the line A-A in FIG. 7A;

FIG. 8B is a cross-sectional view at the line B-B in FIG. 8A;

FIG. 9B is a cross-sectional view at the line C-C in FIG. 9A;

FIG. 10A is a plan view; FIG. 10B is a front view; and FIG. 10C is a perspective view;

FIG. 11A is a plan view; and FIG. 11B is a front view;

DETAILED DESCRIPTION OF THE PREFERRED EMBODIMENTS

Figure 6:
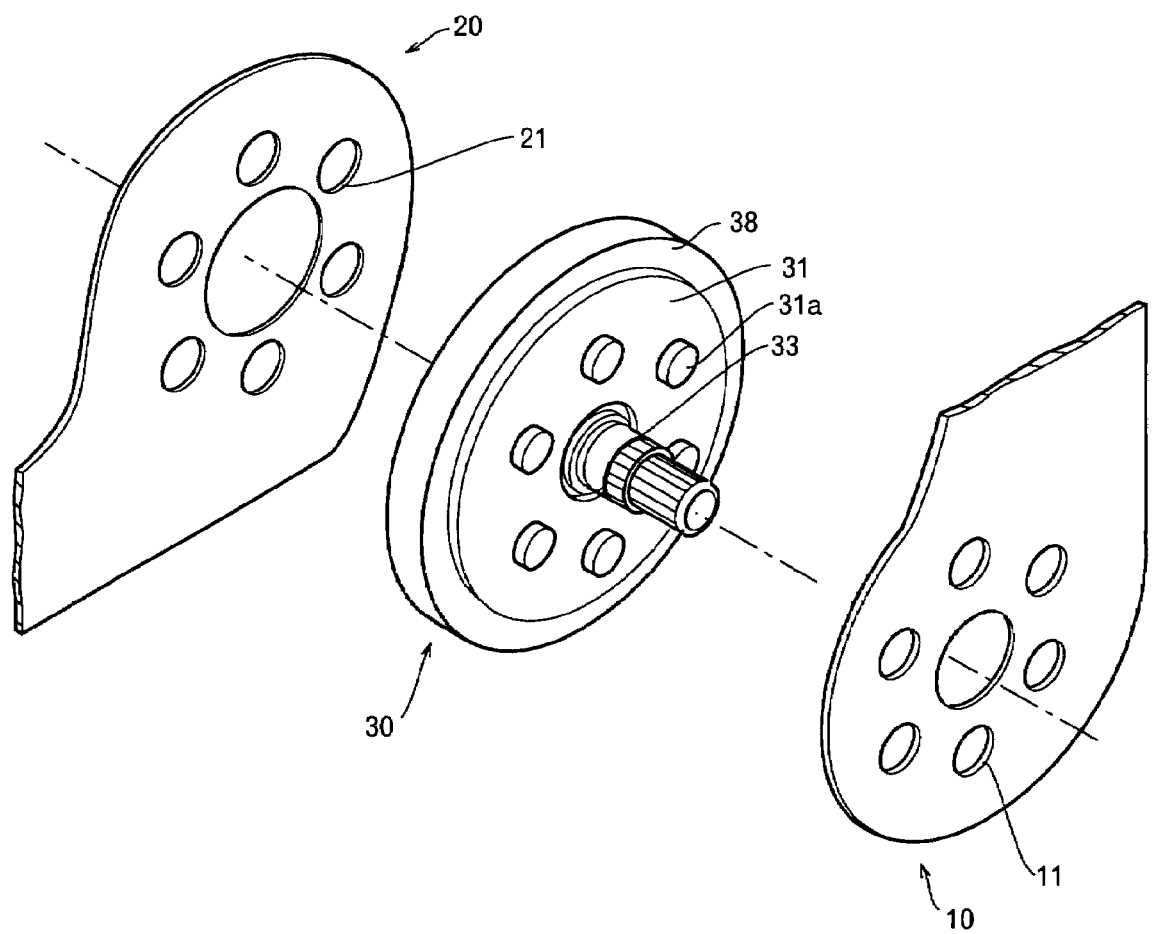
FIG. 6 is a drawing for explaining the connection between a gear mechanism portion and the upper arm and the lower arm.

The following explains an exemplary embodiment of the present invention, with reference to the drawings. In FIG. 2 to FIG. 6, a lower arm 20 is a member on the seat cushion side. As shown in FIG. 6, the lower arm 20 has a plurality of (i.e. six) fitting holes 21 around the tilting center position of the seat back (i.e. the portion that intersects the tilting center axis of the seat back) that are positioned so as to be on the circumference of a circle.

An upper arm 10 is a member on the seat back side. As shown in FIG. 6, the upper arm 10 has a plurality of (i.e. six) fitting holes 11 around the tilting center position of the seat back (i.e. the portion that intersects the tilting center axis of the seat back) that are positioned so as to be on the circumference of a circle.

Figure 2:
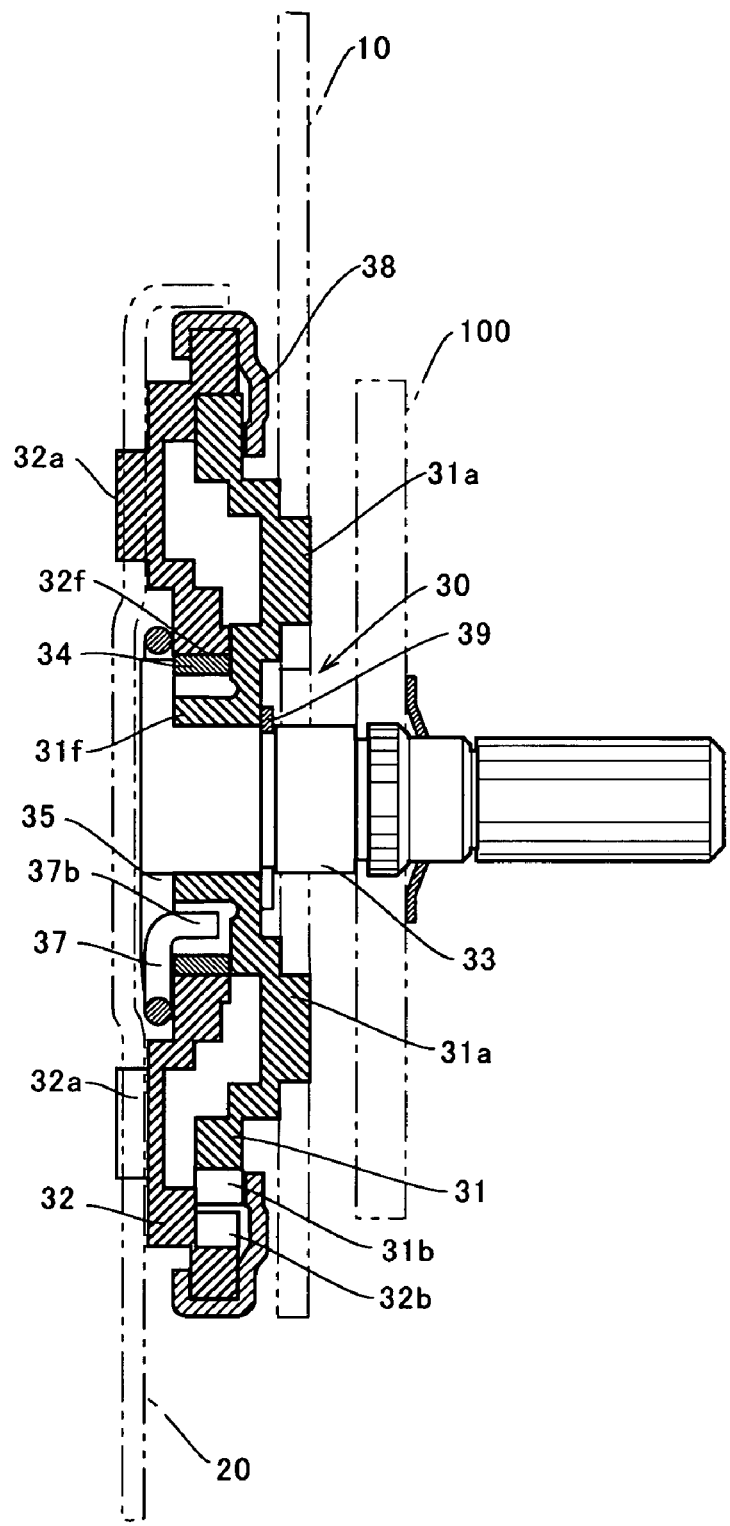
FIG. 2 is a vertical cross-sectional view of the exemplary embodiment of the present invention.

As shown in FIG. 2 in particular, a gear mechanism 30 is attached between the upper arm 10 and the lower arm 20 and is configured so as to adjust the tilting angle of the upper arm 10. An external teeth gear 31 and an internal teeth gear 32 that are included in the gear mechanism 30 respectively have a plurality of cylindrical-column-shaped projections 31a and 32a that are configured so as to fit into the fitting holes 11 in the upper arm 10 and the fitting holes 21 in the lower arm 20.

Figure 7A:
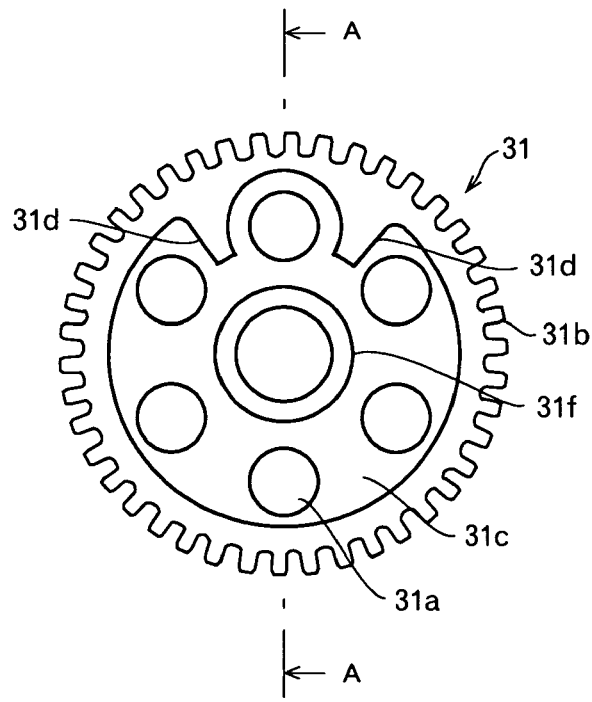
FIG. 7A and FIG. 7B are drawings of an external teeth gear.
Figure 7B:
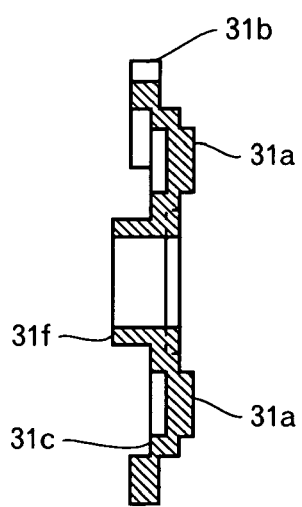

As shown in FIG. 7A, the external teeth gear 31 is substantially in the shape of a circular disc. The external teeth gear 31 has external teeth 31b on the outer circumferential surface thereof and has, at the center, a cylinder portion 31f that extends in the direction toward the internal teeth gear 32. The positioning of the external teeth gear 31 is defined by fitting the plurality of (i.e. six) projections 31a provided on the lateral face thereof into the fitting holes 11 in the upper arm 10. After the positioning is determined in this manner, the external teeth gear 31 is welded to the upper arm 10.

Figure 8A:
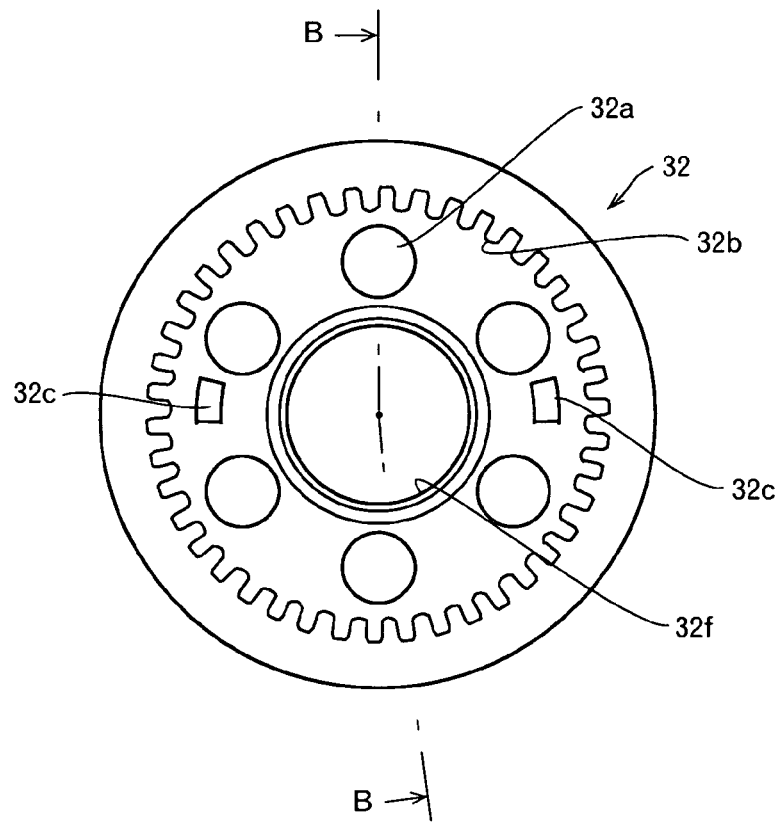
FIG. 8A and FIG. 8B are drawings of an internal teeth gear.
Figure 8B:
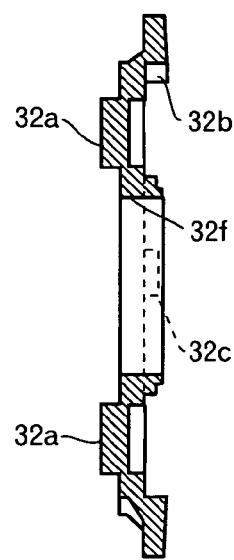

As shown in FIG. 8A, the internal teeth gear 32 is also substantially in the shape of a circular disc. The internal teeth gear 32 has internal teeth 32b of which the number of teeth is larger, at least by one, than the number of teeth of the external teeth 31b in the external teeth gear 31 and that are configured so as to internally touch the external teeth 31b. Also, the internal teeth gear 32 has, at the center, a circular-shaped through hole 32f. The cylinder portion 31f of the external teeth gear 31 is inserted in the through hole 32f. The positioning of the internal teeth gear 32 is defined by fitting the plurality of (i.e. six) cylindrical-column-shaped projections 32a provided on the lateral face thereof into the fitting holes 21 in the lower arm 20. After the positioning is determined in this manner, the internal teeth gear 32 is welded to the lower arm 20.

Of the opposing faces of the external teeth gear 31 and the internal teeth gear 32, the opposing face of the external teeth gear 31 has a concave portion 31c so that a substantially arc-shaped space is formed, whereas the opposing face of the internal teeth gear 32 has a convex portion 32c that projects into the concave portion 31c. Because the internal teeth gear 32 included in the gear mechanism 30 is configured so as to adjust the tilting angle of the seat back, the internal teeth gear 32 naturally rotates relative to the external teeth gear 31, but it is also necessary to regulate the rotation range of the external teeth gear 31 to a predetermined range. The concave portion 31c and the convex portion 32c function as the stoppers to regulate the rotation range. The rotation of the external teeth gear 31 is regulated to the predetermined range by having the convex portion 32c abut against a lateral wall 31d of the concave portion 31c.

Figure 9A:
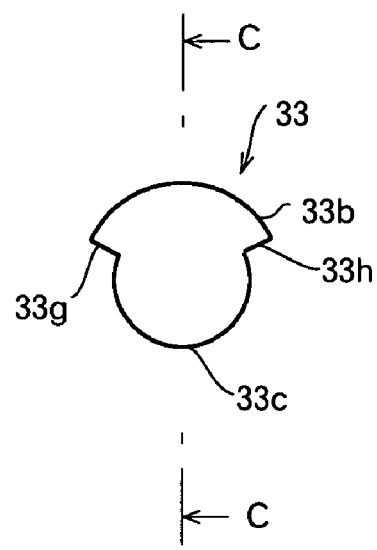
FIG. 9A and FIG. 9B are drawings of a rotation shaft.
Figure 9B:
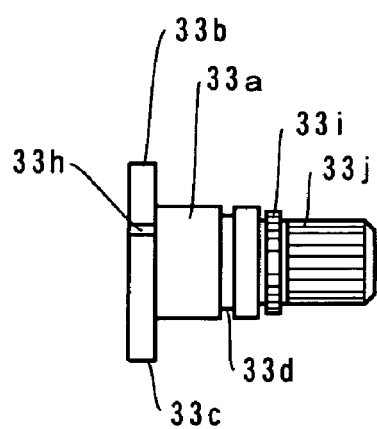
Figure 10A:
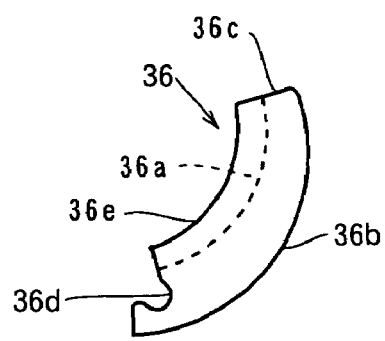
FIG. 10A, FIG. 10B, and FIG. 10C are enlarged views of a wedge-shaped member.
Figure 10B:
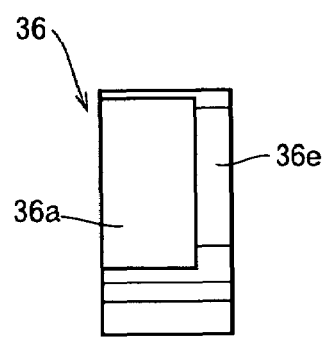
Figure 10C:
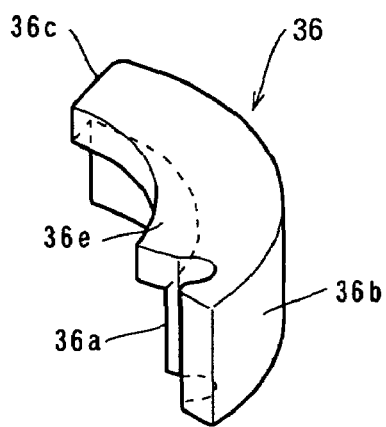

A neck portion 33a of a rotation shaft 33 with a flange, as shown in FIG. 9A and FIG. 9B, is rotatably fitted into the cylinder portion 31f of the external teeth gear 31. The rotation shaft 33 has a flange portion (a striker) 33b, the neck portion 33a, an annular-shaped groove 33d formed in the neck portion 33a, a first serration portion 33i to which a gear 100 shown in FIG. 2 is to be attached, and a second serration portion 33j to which a connection rod (not shown in the drawing) that transfers rotations to the rotation shaft in the reclining device on the other side is to be attached. The flange portion 33b has an arc-shaped cutout portion 33c. The rotation shaft 33 is driven and rotated when the tilting angle of the seat back is adjusted.

A bush 34 that is in the shape of a cylinder and has an anti-abrasion characteristic is fitted into the through hole 32f of the internal teeth gear 32 and is fixed. Further, a pair of wedge-shaped members, namely a wedge-shaped member (a first wedge-shaped member) 35 and a wedge-shaped member (a second wedge-shaped member) 36, are inserted between the inner circumferential surface of the bush 34 and the outer circumferential surface of the cylinder portion 31f of the external teeth gear 31, in such a manner that the first and the second wedge-shaped members 35 and 36 are in contact with the bush 34 and the cylinder portion 31f.

The wedge-shaped members 35 and 36 are shaped so as to be plane symmetrical. The shapes of the wedge-shaped members 35 and 36 are shown in FIG. 5 and FIGS. 10A, 10B, and 10C. The inner circumferential surface 35a and the inner circumferential surface 36a of the wedge-shaped member 35 and the wedge-shaped member 36 each have an inside diameter that is substantially the same as the outer circumferential surface of the cylinder portion 31f of the external teeth gear 31. The outer circumferential surface 35b and the outer circumferential surface 36b of the wedge-shaped member 35 and the wedge-shaped member 36 each have an outside diameter that is substantially the same as the inside diameter of the bush 34. In each of the wedge-shaped member 35 and the wedge-shaped member 36, because the central axes of the inner circumferential surface 35a and the inner circumferential surface 36a do not coincide with the central axes of the outer circumferential surface 35b and the outer circumferential surface 36b, the thickness varies in the manner of a wedge.

Further, the wedge-shaped member 35 and the wedge-shaped member 36 respectively have a fin portion 35e and a fin portion 36e that are configured so as to abut against an end face of the cylinder portion 31f of the external teeth gear 31.

According to the present exemplary embodiment, the outer circumferential surface of the cylinder portion 31f of the external teeth gear 31 that opposes the inner circumferential surface 35a and the inner circumferential surface 36a of the wedge-shaped member 35 and the wedge-shaped member 36 is arranged to be at substantially the same position, in the axial direction of the rotation shaft 33, as the outer circumferential surface of the bush 34 (i.e. the inner circumferential surface of the through hole 32f in the internal teeth gear 32) that opposes the outer circumferential surface 35b and the outer circumferential surface 36b of the wedge-shaped member 35 and the wedge-shaped member 36.

Figure 3:
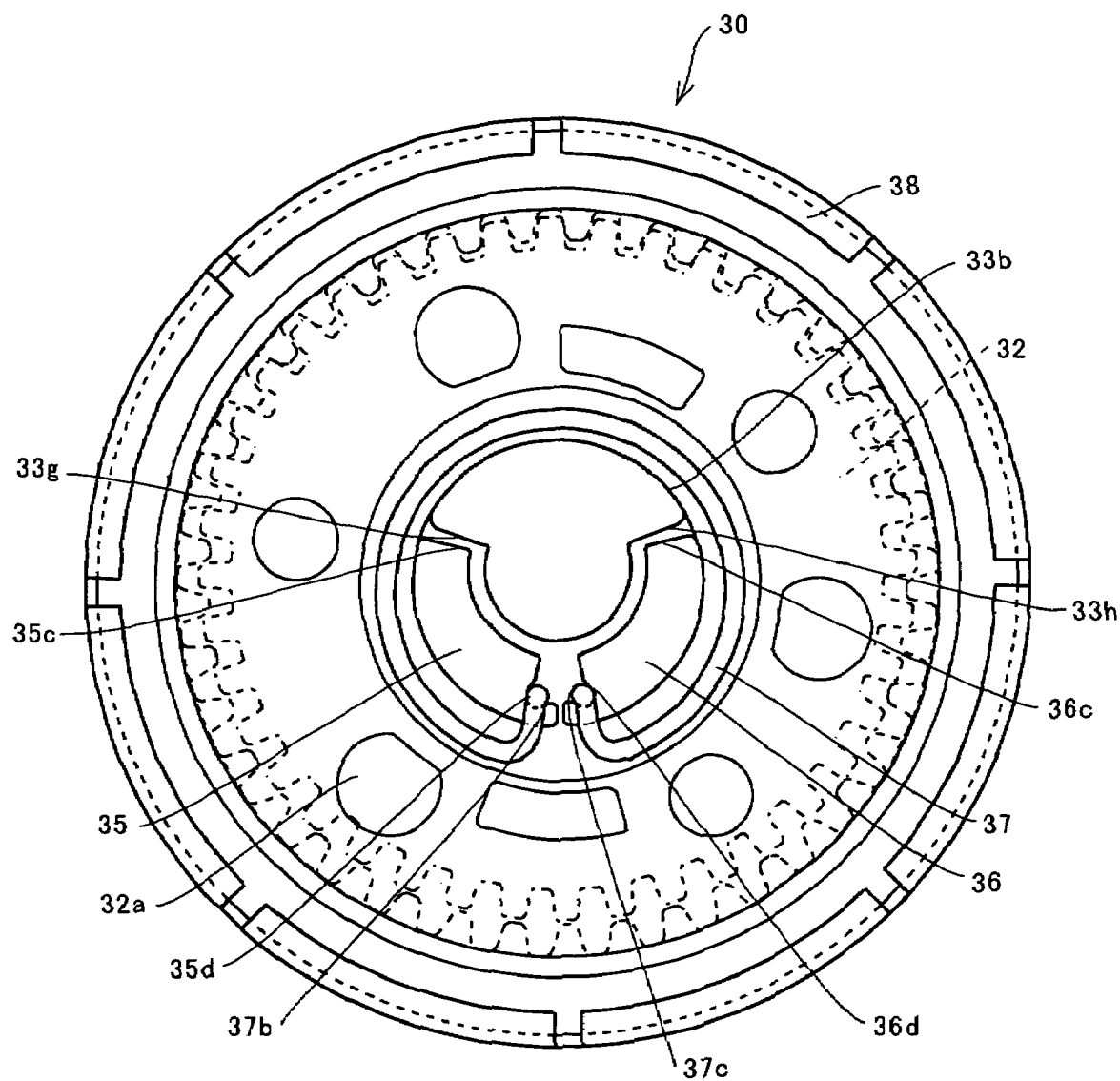
FIG. 3 is a left side view of the exemplary embodiment shown in FIG. 2 (The upper arm and the lower arm are not shown)
Figure 4:
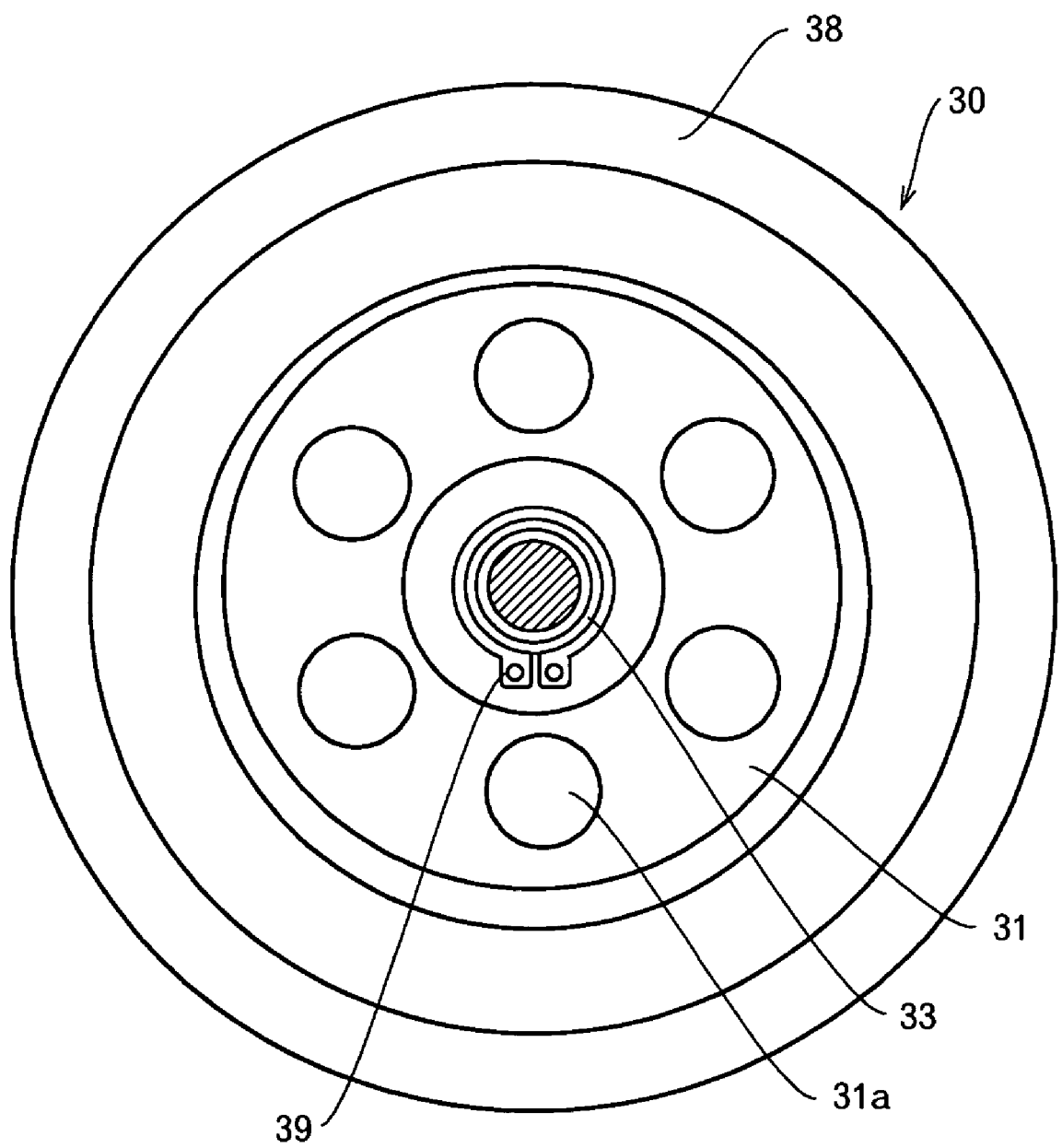
FIG. 4 is a right side view of the exemplary embodiment shown in FIG. 2 (The upper arm and the lower arm are not shown)
Figure 5:
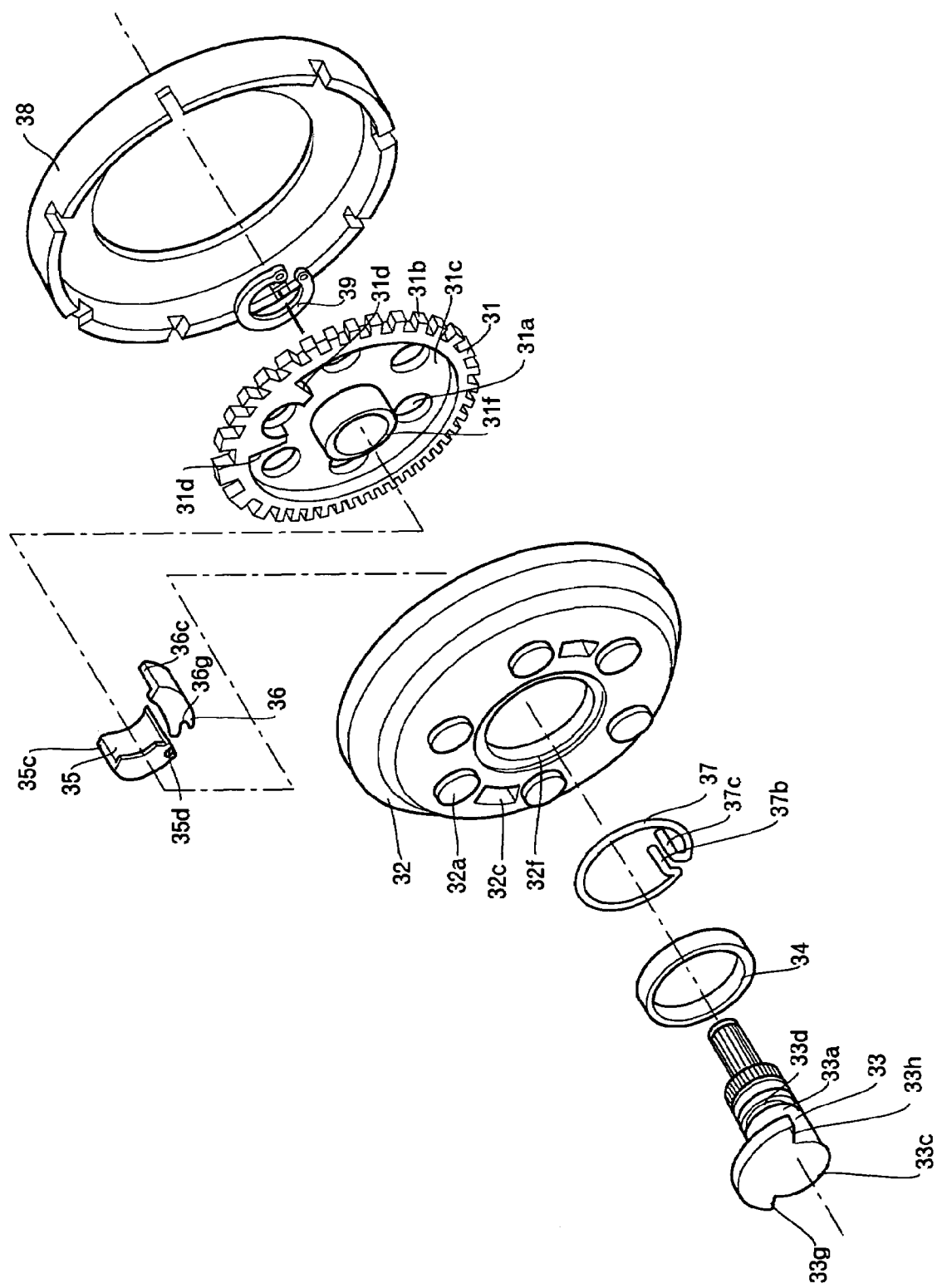
FIG. 5 is an exploded perspective view of a principal part of the exemplary embodiment shown in FIG. 2.

As shown in FIG. 3, into the space between a lateral end face 35c of the wedge-shaped member 35 on the thinner side and a lateral end face 36c of the wedge-shaped member 36 on the thinner side, the flange portion 33b that serves as a striker and is integrally formed with the rotation shaft 33 protrudes. With this arrangement, when the rotation shaft 33 rotates counter-clockwise in FIG. 3, a lateral wall 33g of the cutout portion 33c in the rotation shaft 33 abuts against the lateral end face 35c of the wedge-shaped member 35. On the contrary, when the rotation shaft 33 rotates clockwise in FIG. 3, a lateral wall 33h of the cutout portion 33c in the rotation shaft 33 abuts against the lateral end face 36c of the wedge-shaped member 36 on the opposite side.

Figure 11A:
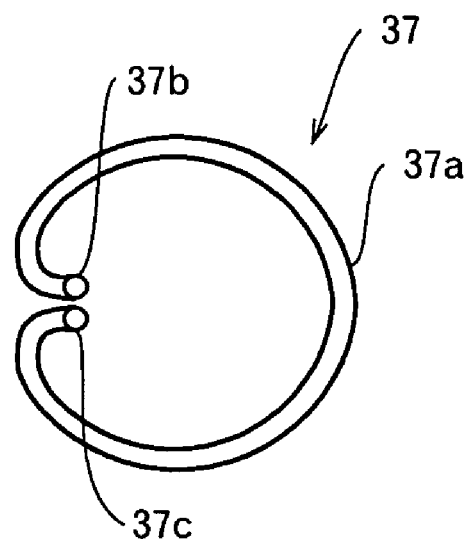
FIG. 11A and FIG. 11B are drawings of a spring.
Figure 11B:
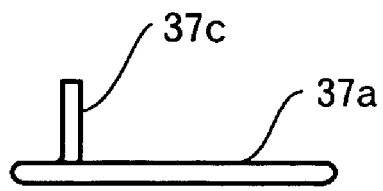

The wedge-shaped member 35 and the wedge-shaped member 36 are disposed between the inner circumferential surface of the bush 34 and the outer circumferential surface of the cylinder portion 31f of the external teeth gear 31 in such a manner that the thicker sides of the wedge-shaped members 35 and 36 oppose each other. Thus, the internal teeth gear 32 is arranged so as to be eccentric with respect to the external teeth gear 31, so that the internal teeth 32b engage with the external teeth 31b. Because of the wedge-shaped member 35 and the wedge-shaped member 36, as described later, the rotation shaft 33 is able to arrange so that the internal teeth 32b and the external teeth 31b engage with one another and also one of the external teeth gear 31 and the internal teeth gear 32 revolves using the gear axis of the other as the revolution center. The wedge-shaped members 35 and 36 receive energizing forces in directions that separate them from each other, from a spring 37 that serves as an energizing unit as shown in FIG. 11A and FIG. 11B.

The spring 37 has an annular portion 37a of which the middle portion corresponds to one turn and end portions 37b and 37c that rise from the annular portion 37a. The annular portion 37a is configured so as to be wound around the rotation shaft 33 in the part except for the space provided between the internal teeth gear 32 and the external teeth gear 31, and especially in the present exemplary embodiment, in the part between the internal teeth gear 32 and the lower arm 20. In addition, the end portion 37b is held in a groove portion 35d provided in the lateral end face of the wedge-shaped member 35 on the thicker side. The end portion 37c is held in a groove portion 36d provided in the lateral end face of the wedge-shaped member 36 on the thicker side. Further, the lower arm 20 is shaped so as to cover the internal teeth gear 32.

The holding member 38 that is in the shape of a cylinder is fitted to the outer circumferential surface of the internal teeth gear 32. Also, the end portions of the holding member 38 on either side protrude toward the center axis so as to sandwich the external teeth gear 31 and the internal teeth gear 32. With this arrangement, it is possible to regulate the external teeth gear 31 and the internal teeth gear 32 so that they do not separate from each other in the axial direction. In addition, a ring 39 for the purpose of slip-off prevention is held in the annular-shaped groove 33d provided on the rotation shaft 33.

Figure 1:
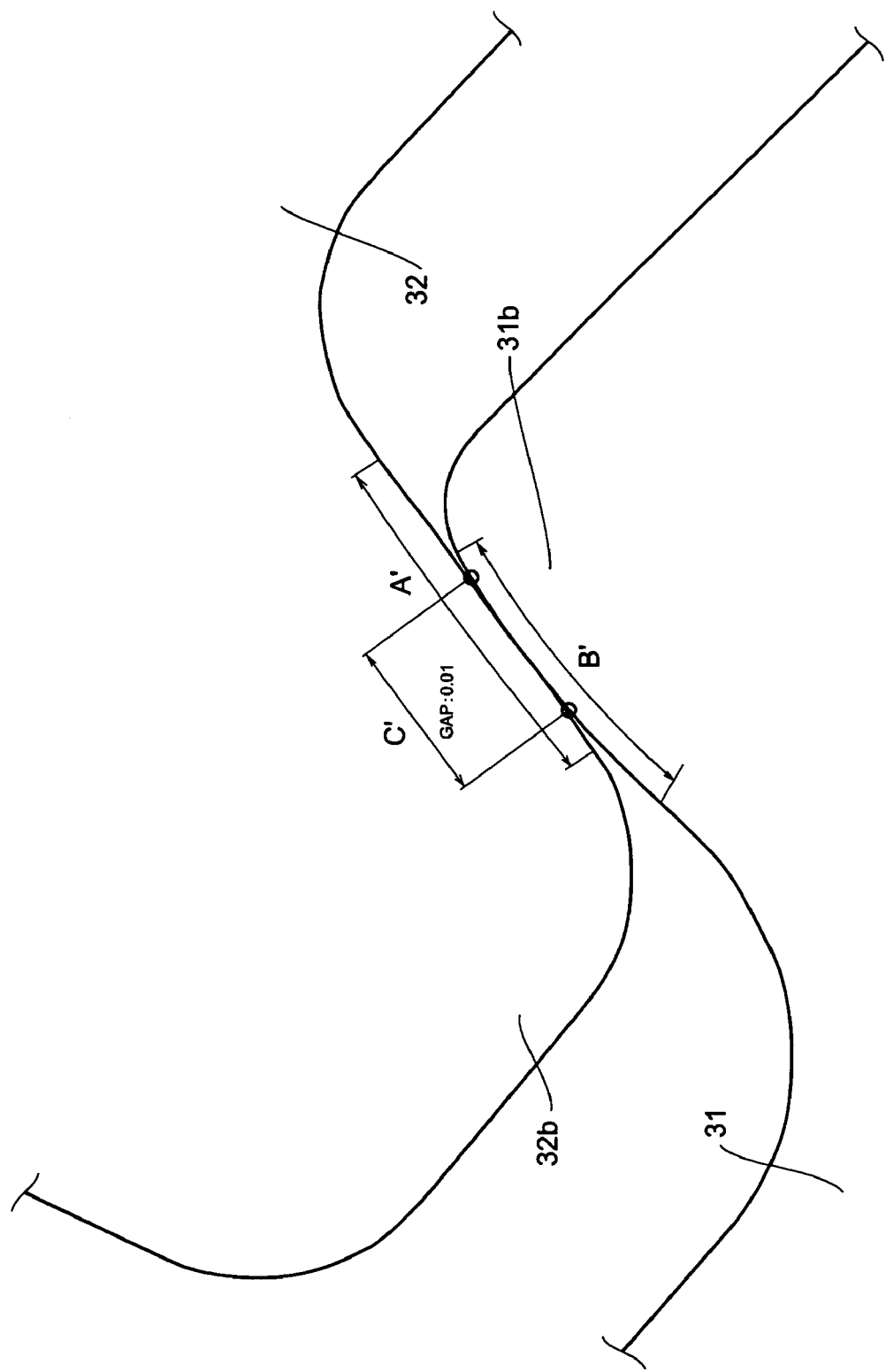
FIG. 1 is a drawing for explaining an inventive portion of an exemplary embodiment of the present invention.

According to the present exemplary embodiment, as shown in FIG. 1, the plane, within the range A', of each of the internal teeth 32b of the internal teeth gear 32 that engages with the external teeth 31b of the external teeth gear 31 is arranged to be flat, whereas the plane, within the range B', of each of the external teeth 31b of the external teeth gear 31 that engages with the internal teeth 32b of the internal teeth gear 32 is arranged to be convex and to protrude in the direction of the flat plane of the internal tooth 32b, so that the external teeth are involute teeth.

Next, the operation according to the exemplary embodiment described above will be explained. When no rotation operation force is applied from an external source to the rotation shaft 33, the spring 37 energizes the wedge-shaped members 35 and 36 in directions that separate them from each other and gives each of the wedge-shaped members 35 and 36 a force in the direction to put in the wedge. With this arrangement, the relative movement between the internal teeth gear 32 and the rotation shaft 33 is prohibited. Also, the gear mechanism 30 is in a locked state in which the external teeth 31b in the external teeth gear 31 engage with the internal teeth 32b in the internal teeth gear 32. Accordingly, the seat back is locked in the present position.

When the gear mechanism 30 is in the locked state, if the rotation shaft 33 is rotated, for example, clockwise in FIG. 3, a force in the direction to pull the wedge-shaped member 36 out of the gap is applied from the lateral wall 33h of the rotation shaft 33 to the lateral end face 36c of the wedge-shaped member 36. Accordingly, the rotation shaft 33 and the wedge-shaped member 36 rotate clockwise with respect to the internal teeth gear 32. As a result, there is a gap between the wedge-shaped member 36 and the neighboring members, and the internal teeth gear 32 becomes movable. Consequently, the wedge-shaped member 35, which is energized by the spring 37, rotates clockwise so as to fill in the gap.

As a result of these movements in conjunction with one another, the wedge-shaped members 36 and 35 rotate clockwise, together with the rotation shaft 33. The same applies to the counter-clockwise rotation. Accordingly, the internal teeth gear 32 is supported by the rotation shaft 33 at an eccentric position where the internal teeth 32b engage with the external teeth 31b. Thus, the external teeth gear 31, the internal teeth gear 32, and the rotation shaft 33 structure the gear mechanism.

As described above, as the rotation shaft (i.e. the flange portion 33b) 33 is rotated, the position at which the external teeth 31b of the external teeth gear 31 engage with the internal teeth 32b of the internal teeth gear 32 changes. Accordingly, it is possible to adjust the tilting angle of the seat back by tilting the upper arm 10 with respect to the lower arm 20.

According to the present exemplary embodiment, the plane of each of the internal teeth 32b of the internal teeth gear 32 that engages with the external teeth 31b of the external teeth gear 31 is arranged to be flat, whereas the plane of each of the external teeth 31b of the external teeth gear 31 that engages with the internal teeth 32b of the internal teeth gear 32 is arranged to be convex and to protrude in the direction of the flat plane of the internal tooth 32b, so that the external teeth are involute teeth. Accordingly, compared to the example according to the conventional technique in which both the internal teeth and the external teeth are involute teeth (i.e. having convex planes and concave planes that are recessed away from the convex planes), the distance between the plane of each of the external teeth 31b that engages with the internal teeth 32b and the plane of each of the internal teeth 32b that engages with the external teeth 31b becomes wider more rapidly. Consequently, if the reclining device according to the present exemplary embodiment and the reclining device according to the conventional technique each have a bump due to the surface roughness that has an equal height and an equal distance from the engagement position, the reclining device according to the present exemplary embodiment has a smaller deviation in the revolution orbit of the external teeth 31b caused by the bump, and also has a smaller operation force, than in the reclining device according to the conventional technique.

Figure 13:
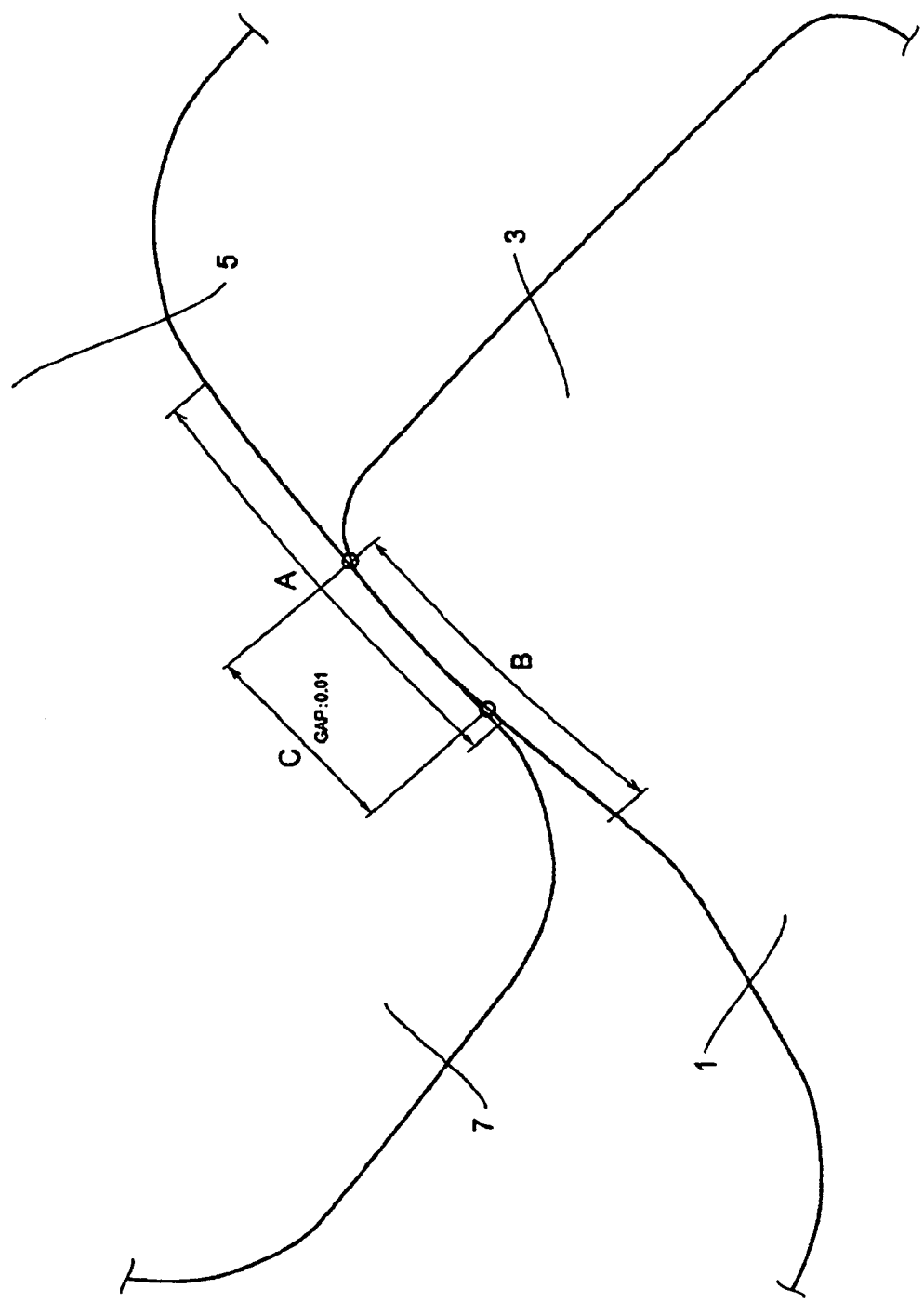
FIG. 13 is a drawing for explaining an example according to a conventional technique.

Further, the plane of each of the internal teeth 32b of the internal teeth gear 32 that engages with the external teeth 31b of the external teeth gear 31 is arranged to be flat, whereas the plane of each of the external teeth 31b of the external teeth gear 31 that engages with the internal teeth 32b of the internal teeth gear 32 is arranged to be convex and to protrude in the direction of the flat plane of the internal tooth 32b so that the external teeth are involute teeth. Accordingly, the range (the range C' shown in FIG. 1) within which the distance between the plane of each of the external teeth 31b that engages with the internal teeth 32b and the plane of each of the internal teeth 32b that engages with the external teeth 31b is equal to or smaller than 0.01 mm, which corresponds to the surface roughness, is smaller than the case where both the internal teeth and the external teeth are involute teeth (cf. FIG. 13). As a result, the point at which an internal tooth 32b and an external tooth 31b engage with each other varies less in the radial direction of the internal teeth gear 32 and the external teeth gear 31, and therefore the operation force also varies less.

It should be noted that the present invention is not limited to the exemplary embodiment described above. For example, according to the exemplary embodiment described above, the plane of each of the external teeth that engages with the internal teeth is arranged to be convex, whereas the plane of each of the internal teeth that engages with the external teeth is arranged to be flat. However, alternatively, it is acceptable to have an arrangement in which the plane of each of the external teeth that engages with the internal teeth is flat, whereas the plane of each of the internal teeth that engages with the external teeth is convex.

Further, the shape of each of the teeth that forms a convex plane is not limited to that of an involute tooth. For example, the teeth may be cycloid teeth or the like.

In addition, according to the exemplary embodiment described above, the external teeth gear 31 is attached to the upper arm 10, and the internal teeth gear 32 is attached to the lower arm 20. However, the arrangement may be reversed.

The inventor of the present invention confirmed, by performing an experiment, that the reclining device that were configured as shown in FIG. 2 to FIG. 11 and in which each of the internal teeth 32b had a flat plane like in the exemplary embodiment had a smaller operation force than in a reclining device according to the conventional technique where the internal teeth were involute teeth.

Figure 12:
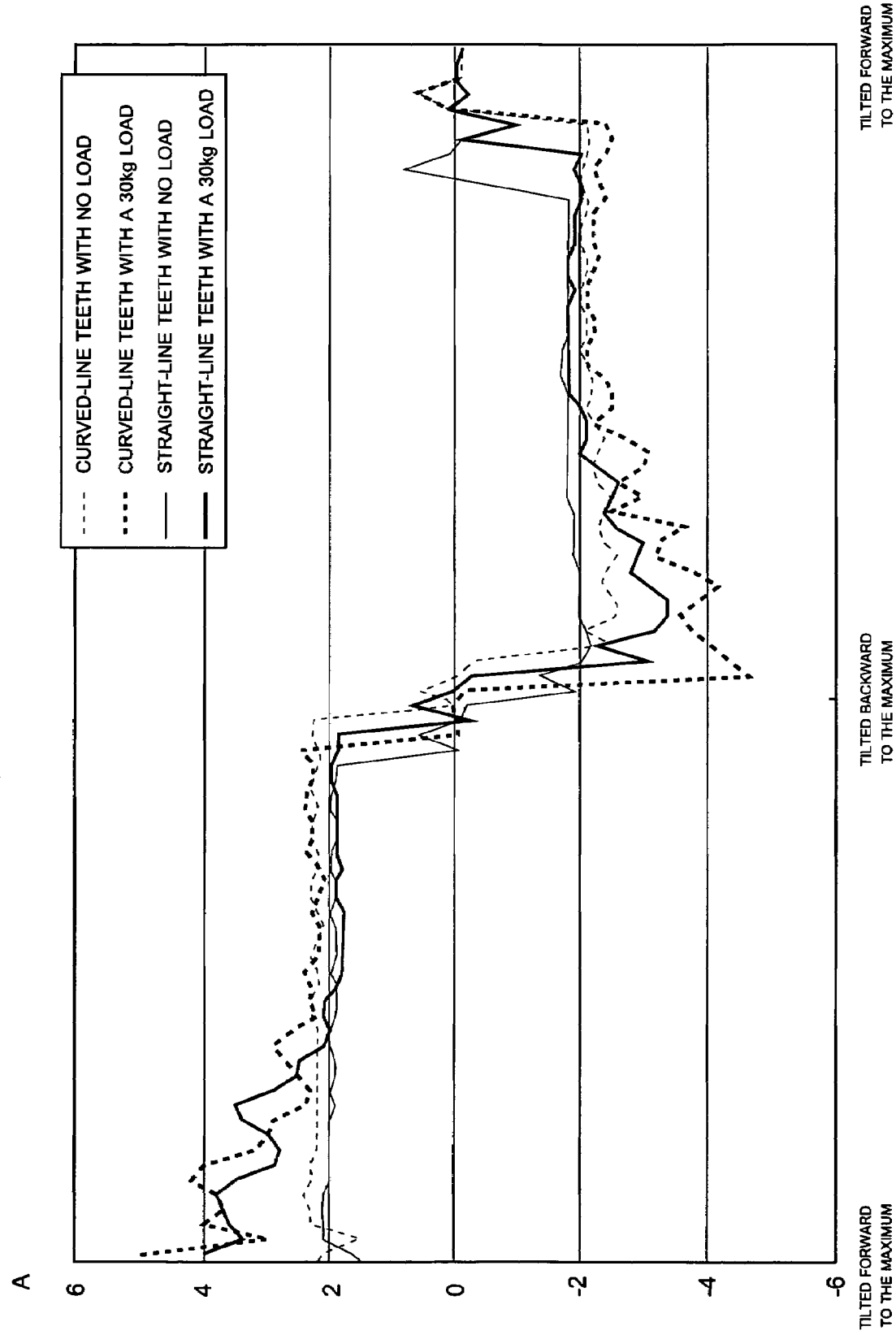
FIG. 12 is a drawing for explaining an embodiment example of the present invention.

More specifically, the electric current value in a motor was measured while the rotation shaft 33 was driven by the motor. In FIG. 12, the vertical axis shows the electric current value in the motor, whereas the horizontal axis shows the reclining angle of the seat back.

In the experiment, the seat back was tilted and moved from the maximum forward position to the maximum backward position, and then was tilted again from the maximum backward position to the maximum forward position, while the electric current value was measured.

With the reclining device in which each of the internal teeth 32b had a flat plane, the electric current value was measured for a case where a load of 30 kg was applied to the seat back side and for a case where no load was applied.

Also, with the reclining device in which each of the internal teeth 32b was an involute tooth, the electric current value was measured for a case where a load of 30 kg was applied to the seat back side and for a case where no load was applied.

As shown in the drawing, for both of the cases where the load of 30 kg was applied to the seat back side and where no load was applied, it was confirmed that the reclining device in which each of the internal teeth 32b had a flat plane exhibited a smaller electric current, and therefore a smaller operation force, than the reclining device in which each of the internal teeth 32b was an involute tooth.

What is claimed is:

1. A reclining device that includes an external teeth gear and an internal teeth gear and in which a rotation axis of one of the external teeth gear and the internal teeth gear revolves around a rotation axis of the other, the external teeth gear having external teeth on an outer circumferential surface thereof and being disposed with one of a member on a seat cushion side and a member on a seat back side, and the internal teeth gear having internal teeth of which a number of teeth is larger than that of the external teeth of the external gear teeth gear and that are configured so as to engage with the external teeth and being disposed with the other of the member on the seat cushion side and the member on the seat back side, wherein one of a plane of contact of the external teeth whereat the sides of external teeth engage with the sides of internal teeth and a plane of contact of the internal teeth whereat the sides of internal teeth engage with the sides of external teeth is flat, and the other of the plane of contact of the external teeth and plane of contact of the internal teeth is convex.

2. The inclining device according to claim 1, wherein the plane of contact of the internal teeth is flat, and the external teeth are involute teeth.

* * * * *